(12) United States Patent
Fortezza

(10) Patent No.: US 10,894,618 B2
(45) Date of Patent: Jan. 19, 2021

(54) AUTOMATIC SATELLITE TELEMETRY, TRACKING AND COMMAND SYSTEM

(71) Applicant: TELESPAZIO S.P.A., Rome (IT)

(72) Inventor: Raimondo Fortezza, Rome (IT)

(73) Assignee: TELESPAZIO S.P.A., Rome (IT)

( * ) Notice: Subject to any disclaimer, the term of this patent is extended or adjusted under 35 U.S.C. 154(b) by 337 days.

(21) Appl. No.: 16/205,101

(22) Filed: Nov. 29, 2018

(65) Prior Publication Data
US 2020/0024012 A1 Jan. 23, 2020

(30) Foreign Application Priority Data
Nov. 30, 2017 (IT) .................. 102017000138364

(51) Int. Cl.
*B64G 3/00* (2006.01)
*G01S 19/27* (2010.01)
*G01S 19/28* (2010.01)

(52) U.S. Cl.
CPC .............. *B64G 3/00* (2013.01); *G01S 19/27* (2013.01); *G01S 19/28* (2013.01)

(58) Field of Classification Search
CPC ......... B64G 3/00; G01S 19/28; G01S 5/0009; H04B 7/195; H04B 7/18517; H04B 7/18515; H04B 7/18552
See application file for complete search history.

(56) References Cited

U.S. PATENT DOCUMENTS

| | | | | |
|---|---|---|---|---|
| 6,678,520 | B1 * | 1/2004 | Wang | ................. H04B 7/18513 455/13.1 |
| 2007/0155318 | A1 * | 7/2007 | Monte | .................... H04B 7/195 455/12.1 |
| 2011/0015852 | A1 | 1/2011 | Blomenhofer et al. | |
| 2017/0070939 | A1 | 3/2017 | Chong et al. | |
| 2017/0310382 | A1 | 10/2017 | Darby, III | |

OTHER PUBLICATIONS

"space-track.org," Space tracking database, last accessed Nov. 29, 2018, https://www.space-track.org/auth/login.
Italian Search Report dated Jul. 31, 2018 for Italian Application No. IT201700138364, 8 pages.

* cited by examiner

*Primary Examiner* — Marthe Y Marc-Coleman
(74) *Attorney, Agent, or Firm* — Dorsey & Whitney LLP

(57) ABSTRACT

A satellite telemetry, tracking and command system including ground stations, on-board units and a network control center. Each on-board unit is installed on board a respective satellite and is configured to compute a future orbital path of the satellite and determine when the respective satellite is within the visibility region of one of the ground stations on the basis of the satellite's positions and velocities computed and of the stored coverage data. When the respective satellite is within the visibility region of a ground station, the on-board unit may transmit to said ground station the downlink signals and receive therefrom the uplink signals; and carry out actions/operations corresponding to the commands received from the ground stations. The ground stations may be networked together and may send and receive information to and from the network control center.

10 Claims, 3 Drawing Sheets

AUTOMATIC SATELLITE TELEMETRY, TRACKING AND COMMAND SYSTEM

CROSS-REFERENCE TO RELATED APPLICATIONS

This application claims priority from Italian Patent Application No. 102017000138364 filed on Nov. 30, 2017, the disclosure of which is incorporated by reference.

TECHNICAL FIELD OF THE INVENTION

The present invention concerns, in general, a system for satellite Telemetry, Tracking and Command (TT&C) applications. In particular, the present invention finds advantageous, although non-exclusive, application with the so-called small satellites, microsatellites, nanosatellites, picosatellites and femtosatellites, frequently made in the form of cubesats.

STATE OF THE ART

As is known, a satellite orbiting the earth sends telemetry data to, and receives commands from, a respective ground station located on earth's surface. Typically, a single ground station is able to cover about 3% of the orbit of a Low Earth Orbit (LEO) satellite. Therefore, LEO satellites are uncontrolled for most of their orbital time.

In order to increase coverage time, a ground station may be equipped with tracking antennas designed to track satellites from their entry into ground station's visibility region up to their outgo therefrom. Tracking antennas are usually able to establish a link with a satellite from 10° above the horizon, with an overall coverage angle of 160°. Anyway, a ground station needs satellite orbital data in order to point at, and track satellites with its tracking antennas.

Typically, for a traditional large satellite, orbital data are known, since are managed by a mission control center staffed by a flight dynamics group that receives orbital insertion parameters from launch authorities and follows and predicts the specific satellite orbit during the whole satellite mission.

As is known, in addition to traditional large satellites, recent technological developments in space/satellite sector have led to the feasibility of making smaller and smaller satellites (e.g., the so-called microsatellites (often made in the form of cubesats), or even miniaturized as nanosatellites, picosatellites and femtosatellites), which are capable of performing an increasing number of functions (e.g., remote sensing, scientific experiments, in-orbit testing of components, etc.), while manufacturing times and costs are reduced. This kind of satellites provide a series of technical and non-technical (e.g., economical/commercial) advantages with respect to traditional larger satellites and, hence, are becoming increasingly used for space missions, in particular for those having a limited mission budget, or for large satellite constellations requiring a huge number of satellites. Additionally, the feasibility of manufacturing small mass and size, low-cost satellites is enabling the opening of the space/satellite market also to new types of satellite operators, such as countries, institutions (e.g., universities and research centers), industries and companies, traditionally excluded therefrom (e.g., for cost reasons).

Typically, small/micro/nano/pico/femto-satellites are launched in orbit as piggyback payload on board medium/large class launch vehicles. In this way, a large number of these satellites may be released in orbit by means of a single launcher.

Ground stations for small/micro/nano/pico/femto-satellites are usually made based on COTS (i.e., "Commercial Off-The-Shelf" or "Commercially available Off-The-Shelf") elements. Anyway, the cost of a COTS-based ground station may reach several tens of thousands of euros. Additionally, for the overall operating cost of one of these satellites, there should be considered also the expenses for management and maintenance of the ground station and for the staff there employed. It is worth noting that these costs could be unaffordable for satellite operators with limited economical resources (e.g., universities and research centers).

Moreover, also in the case of ground stations for small/micro/nano/pico/femto-satellites, there is the need for satellite orbital data in order to use tracking antennas. Unfortunately, since these satellites are typically deployed in orbit with multiple release mechanisms as piggyback payload on board commercial launchers, their orbital data are known only after the identification and tracking made by the dedicated authorities.

In fact, the design of small/micro/nano/pico/femto-satellites is typically based on a cost-efficient flight dynamics and operations scenario relying only on publicly available Two-Line Element (TLE) sets provided by the United States STRATegic COMmand (USSTRATCOM), based on measurements from the US Space Surveillance Network (US-SSN) and distributed through the website www.space-track.org. Moreover, the Joint Functional Component Command for SPACE (JFCC SPACE) is the US authority that is responsible for identifying, cataloging and tracking, on the basis of data collected by the US-SSN, over 23,000 man-made objects orbiting the earth. However, the ever increasing number of small/micro/nano/pico/femto-satellites is posing extraordinary challenges to all authorities responsible for satellite identification and tracking.

Additionally, this approach relies only on the capability of the US-SSN to rapidly track, discriminate, and identify satellites. However, the US-SSN TLEs do not guarantee a timely provision of needed input data to appropriately steer ground stations' antennas to establish communication links with the satellites. For most of the small satellites recently launched in orbit, the first TLE was available only after more than 1 week. Furthermore, it took several weeks before the USSTRATCOM performed identification of all the launched satellites.

Therefore, in view of the foregoing, a small/micro/nano/pico/femto-satellite is typically left completely uncontrolled, with related problems and risks, for a certain period (namely, until its orbital data become available). Moreover, also when the orbital parameter are available, a single ground station is able to cover only about 3% of the orbit of a LEO satellite. Therefore, if a LEO small/micro/nano/pico/femto-satellite is not equipped with high speed data link means, the overall data amount transmitted to ground could be very limited.

In recent years, owners of small/micro/nano/pico/femto-satellites tried federating by forming a ground station network including all their ground stations so that, when a specific ground station is not used for the respective satellite, it can be made available for another satellite belonging to the federation. The idea is, in principle, very interesting and allows developing software tools enabling data exchange among the different ground stations of the federation. Examples of this kind of ground station federation is the Global Educational Network for Satellite Operations (GENSO) and the Satellite Networked Open Ground Station (SatNOGS).

However, the limit of these initiatives is the reliability and the stability of the single ground stations. In fact, since the manufacture, management and maintenance of a single ground station involve non-negligible costs (including those for the staff there employed), when a small/micro/nano/pico/femto-satellite stops operating, typically also the respective ground station stops operating for economic saving reasons.

Therefore, nowadays several drawbacks/limitations affect small/micro/nano/pico/femto-satellite sector, in particular small/micro/nano/pico/femto-satellites designed for LEO orbit, namely:

1) for a certain initial period, orbital data of a satellite are not known and the respective ground station cannot track and control the satellite;

2) even when the orbital data are known, for a LEO satellite the coverage period of a single ground station is only about 3% of the total satellite orbital time;

3) a ground station involves non-negligible costs that can be unaffordable for low-budget missions.

Moreover, if a LEO satellite, both of the traditional large type and of the small/micro/nano/pico/femto type, has a malfunction, it is detected only when the satellite pass over the respective ground station sending alert signals to ground, and this may occur after many hours, or even days, from malfunction occurrence.

In this connection, US 2017/070939 A1 discloses a system and a method for providing continuous communications access to satellites in geocentric, non-geosynchronous orbits. In particular, the system according to US 2017/070939 A1 includes a constellation of LEO satellites and a plurality of ground stations to enable continuous communication for other geocentric, non-geosynchronous spacecraft. Network latency, Doppler effects, and router handover time are minimized through selection of orbital parameters for the satellite constellation and locations of ground stations. A plurality of polar or near polar orbit planes is presented at equally spaced right ascension of the ascending node (RAAN), in an alternative ascending-descending pattern. Inter-satellite communication is performed in-plane to relay data to a ground station, and out-of-plane or in-plane to communicate with another satellite that is not a member of the constellation. The number and location of ground stations is selected based on the number of small satellites and orbital planes in order to maintain continuous communications. The system according to US 2017/070939 A1 can enable continuous communication for geocentric satellites without the need for line-of-sight access to a ground station.

Additionally, US 2017/310382 A1 discloses a system and a method providing for a plurality of satellite ground stations, distributed across some geographic region, and for these regions in turn to be scalable to cover large regions or even the globe using a combination of LEO satellites, terrestrial participant devices, and cloud-based communications. The solution according to US 2017/310382 A1 is intended to solve the short temporal window problem inherent to the scenario where a single base or ground station is trying to track and communicate with a low-end LEOSAT or even a cube-satellite.

OBJECT AND SUMMARY OF THE INVENTION

A general object of the present invention is that of alleviating, at least in part, the above drawbacks/limitations affecting LEO satellites, of both the traditional large type and the small/micro/nano/pico/femto type.

In particular, a specific object of the present invention is that of providing a system that is able to provide Telemetry, Tracking and Command (TT&C) services for LEO satellites, in particular small/micro/nano/pico/femto-satellites, without any necessity for orbital data provision from external sources, and with enhanced coverage and cheaper costs than current solutions.

These and other objects are achieved by the present invention in that it relates to a satellite telemetry, tracking and command system, as defined in the appended claims.

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope consistent with the principles and features disclosed herein and defined in the appended claims.

Figure 1:
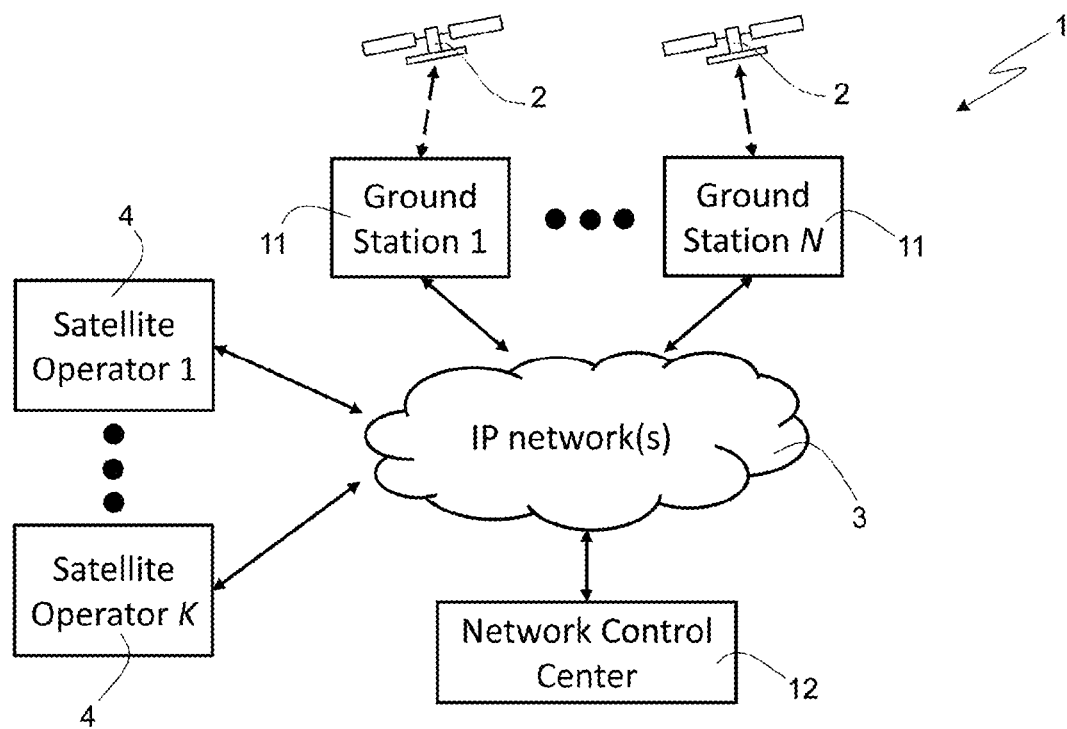
FIG. 1 schematically illustrates a Telemetry, Tracking and Command (TT&C) system according to a preferred, non-limiting embodiment of the present invention.

FIG. 1 schematically illustrates a satellite Telemetry, Tracking and Command (TT&C) system (denoted as a whole by 1) according to a preferred, non-limiting embodiment of the present invention.

In particular, the satellite TT&C system 1 includes:

a plurality of ground stations 11, each of which is located at a respective position on earth's surface and is designed to, when a satellite 2 is in a respective visibility region of the around station 11, receive downlink signals carrying telemetry data from said satellite 2 and transmit thereto uplink signals carrying one or more commands;

on-board TT&C units, each of which is installed on board a respective satellite 2 and is designed to receive Global Navigation Satellite System (GNSS) signals from one or more GNSSs, compute, on the basis of the received GNSS signals, positions and velocities of said respective satellite store coverage data indicative of the positions of the around stations 11 on earth's surface and of the visibility regions of said ground stations 11, determine when said respective satellite 2 is within the visibility region of one of the ground stations 11 on the basis of the satellite's positions and velocities computed and of the stored coverage data, when said respective satellite 2 is within the visibility region of a ground station 11, transmit downlink signals carrying telemetry data to said ground station 11 and receive therefrom uplink signals carrying one or more commands, and carry out actions/operations corresponding to the commands received from the ground stations 11; and a network control center 12, that is connected to the ground stations 11 through one or more Internet Protocol (IP) networks 3 (e.g., the Internet network), and is designed to receive commands for satellites 2 through the IP network(s) 3 from satellite operators 4 that own/manage, each, one or more respective satellites 2, provide, through the IP network(s) 3, the around stations 11 with the commands for the satellites 2, receive, through the IP network(s) 3, from said ground stations 11, the telemetry data sent by the satellites 2, and provide, through the IP network(s) 3, each satellite operator 4 with the telemetry data sent by the respective satellite(s) 2.

Preferably, each on-board TT&C unit is further designed to:

compute a trajectory of the respective satellite 2 based on the satellite's positions and velocities computed;

determine when said respective satellite 2 is within the visibility region of one of the ground stations 11 on the basis of the satellite's trajectory computed and of the stored coverage data; and, when said respective satellite 2 is within the visibility region of a ground station 11, transmit to said ground station 11 also downlink signals carrying orbital data indicative of the satellite's positions, velocities and trajectory computed.

Moreover, the network control center 12 is conveniently designed also to:

receive, through the IP network(s) 3, from the around stations 11, the orbital data sent by the satellites 2; and provide, through the IP network(s) 3, each satellite operator 4 with the orbital data sent by the respective satellite(s) 2.

Preferably, each on-board TT&C unit is further designed to transmit also downlink signals carrying alert data indicative of a malfunction/anomaly/failure occurred on board the respective satellite 2, and the network control center 12 is further designed to:

receive, through the IP network(s) 3, from the ground stations 11, the alert data sent by the satellites 2; and provide, through the IP network(s) 3, each satellite operator 4 with the alert data sent by the respective satellite (s) 2.

More preferably, each on-board TT&C unit is further designed to:

compute a trajectory of the respective satellite 2 based on the satellite's positions and velocities computed;

compute a future orbital path of said respective satellite 2 based on the satellite's trajectory computed;

check, based on the stored coverage data, whether the satellite's future orbital path computed passes through the visibility region of one of the ground stations 11; and, if the satellite's future orbital path computed passes through the visibility region of a ground station 11, compute an entry time (Te) at which the respective satellite 2 enters the visibility region of the ground station 11, compute an outgo time (To) at which said respective satellite 2 goes out of the visibility region of said ground station 11, if a time difference between the computed outgo and entry times (To−Te) exceeds a first predefined threshold, compute one or more transmission times and one or more reception times depending on whether said time difference (To−Te) is lower than or exceeds a second predefined threshold, and transmit the downlink signals at the transmission time (s) computed and receive the uplink signals at the reception time(s) computed.

Conveniently, each on-board TT&C unit is further designed to update the stored coverage data based on one or more received commands (e.g., by modifying, correcting or deleting previously stored data indicative of the position and/or of the visibility region of one or more ground stations 11, or storing new data indicative of the position and the visibility region of one or more new ground stations 11 to be added).

Figure 2:
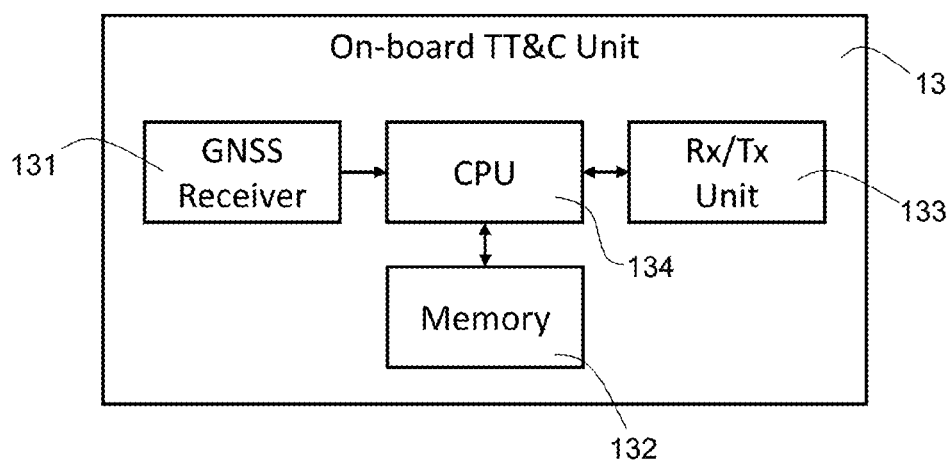
FIG. 2 schematically illustrates a preferred architecture of an on-board TT&C unit belonging to the satellite TT&C system of FIG. 1.

FIG. 2 schematically illustrates a preferred architecture for the on-board TT&C units of the satellite TT&C system 1. In particular, as shown in FIG. 2, each on-board TT&C unit (denoted as a whole by 13) includes:

a GNSS receiver 131, that is designed to receive GNSS signals from one or more GNSSs (such as the Global Positioning System (GPS) and/or the Galileo System and/or the GLONASS system and/or the Beidou Navigation Satellite System, etc.) and to compute, on the basis of the received GNSS signals, positions and velocities of the satellite 2 which the on-board TT&C unit 13 is installed on board;

a memory 132 for storing the coverage data indicative of the positions of the ground stations 11 on earth's surface and of the visibility regions of said ground stations 11;

a receiving/transmitting (Rx/Tx) unit 133 operable to transmit the downlink signals carrying the telemetry data and receive the uplink signals carrying the commands;

a control and processing unit (CPU) 134, that is connected to the GNSS receiver 131, the memory 132 and the Rx/Tx unit 133, and is programmed to determine when the satellite 2 is within the visibility region of one of the ground stations 11 on the basis of the satellite's positions and velocities computed by the GNSS receiver 131 and of the coverage data stored on the memory 132, when the satellite 2 is within the visibility region of a ground stations 11, operate the Rx/Tx unit 133 to transmit downlink signals carrying telemetry data (e.g., data indicating integrity state of the satellite 2) to said ground station 11 and to receive therefrom uplink signals carrying one or more commands, and carry out actions/operations corresponding to the commands received from the ground stations 11.

Preferably, the Rx/Tx unit 133 is designed to transmit Ultra High Frequency (UHF) downlink signals (i.e., at frequencies in the range between 300 MHz and 3 GHz) and receive Very High Frequency (VHF) uplink signals (i.e., at frequencies in the range between 30 and 300 MHz). Obviously, in this case, the ground stations 11 are designed to transmit VHF uplink signals and receive UHF downlink signals. In this way, the Rx/Tx unit 133 can be equipped with omnidirectional antennas that do not need specific pointing.

Anyway, the Rx/Tx unit 133 may be conveniently designed to operate also in other radio bands (in addition to, or in place of, UHF and VHF bands), such as in S band (i.e., at frequencies in the range between 2 and 4 GHz). In this case, the Rx/Tx unit 133 is conveniently equipped with one or more directional antennas and designed to appropriately steer said directional antenna(s).

Preferably, the CPU 134 is programmed to produce short telemetry strings/packets to be transmitted via the downlink signals by the Rx/Tx unit 133. Conveniently, each telemetry string/packet may include an identifier of the satellite 2 (i.e., of the sender), an identifier of the ground station 11 (i.e., of the addressee) and telemetry data (such as a Health & Status message).

Conveniently, the CPU 134 may be made by means of a Field-Programmable Gate Array (FPGA) appropriately programmed by means of a specific software/firmware code to perform operations according to the teachings of the present invention.

Conveniently, in use, the network control center 12 decodes, verifies and stores telemetry data of the satellites received from the ground stations 11, and sends the telemetry data to the respective satellite operators 4 via internet secure connection.

As previously explained, the network control center 12 manages also commands to the satellite 2, receiving command requests from the satellite operators 4 and forwarding the commands to the transmitting stations 11. Conveniently, the network control center 12 selects the most appropriate ground station 11 for command uplink transmission by finding the fastest way to send a command to the respective addressee satellite 2, namely by using the ground station 11 which will be first visible to said satellite 2.

A high number of ground stations 11 globally distributed on earth's surface allows ensuring frequent data links with the satellites 2.

Conveniently, the ground stations 11 are very small and made based on COTS components to simplify their development and to maintain them simple and inexpensive.

Preferably, each ground station 11 includes: a respective pair of VHF and UHF turnstile antennas, a respective VHF radio modem, respective broadband Software Defined Radio (SDR) means, a respective computing unit in charge of communication management and synchronization with the network control center 12, and a respective GNSS receiver for local timing.

The satellite TT&C system 1 is an automatic low data rate communication system for LEO satellites, preferably of the small/micro/nano/pico/femto type (remaining it clear that said satellite TT&C system 1 may be advantageously exploited also for LEO satellites of the traditional large type), representing an improved alternative to the traditional solutions based on a ground segment made up of a single ground station specifically dedicated to one mission.

In fact, by using the satellite TT&C system 1, a satellite operator 4 shall not procure its own around station, but it may receive, via internet, short telemetry packets generated by its satellite 2 directly at its premises, with an approach defined "virtual" ground segment. The satellite operator 4 is not aware where all the ground stations 11 are located, but the short telemetry packets are received with high frequency thanks to the large number of ground stations 11 distributed globally and connected in a web-based fashion.

As previously said, the satellite TT&C system 1 may be advantageously exploited also for traditional large LEO satellites, since its automatic telemetry transmission mechanism can be used by traditional satellite operators to receive with high frequency the Health and Status telemetry, and can be used also to upload commands in case of anomaly/malfunction/failure occurred on board.

Figure 3:
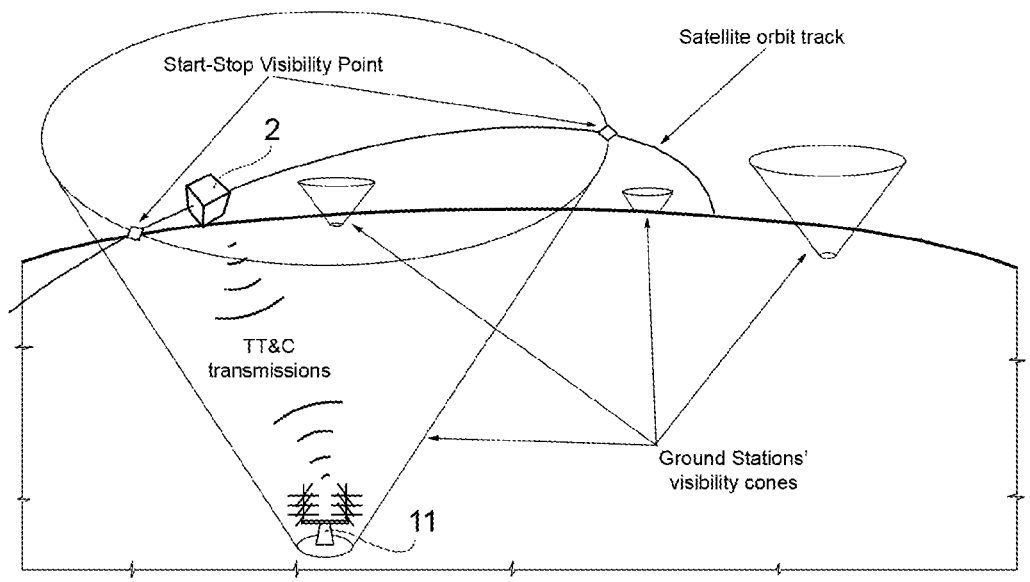
FIGS. 3 and 4 schematically illustrate an example of operation of the satellite TT&C system of FIG. 1.
Figure 4:
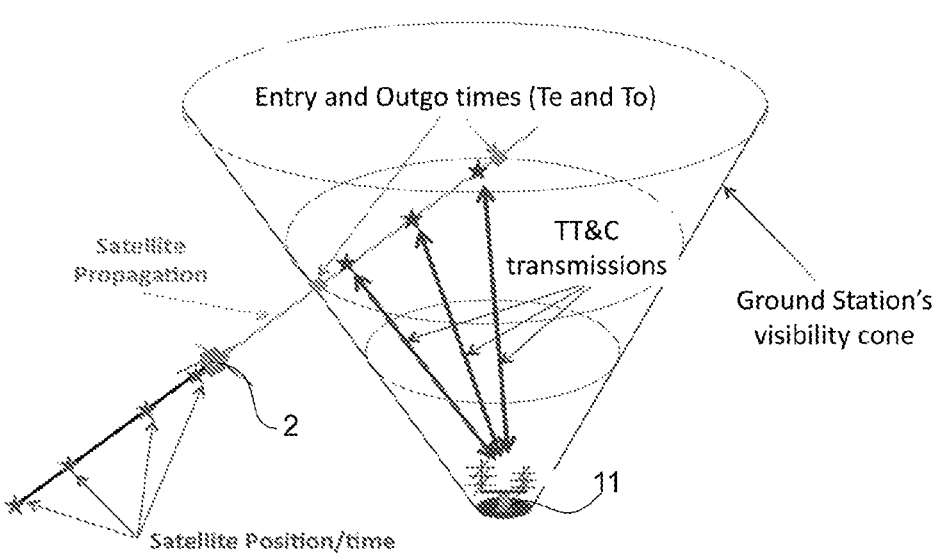

Hereinafter, a preferred, non-limiting mode of carrying out the present invention will be described with reference to FIGS. 3 and 4, that schematically illustrate an example of operation of the satellite TT&C system 1.

Telemetry data transmission is completely automatic since the on-board TT&C unit 13 is equipped with all the elements necessary to decide whether and when to activate telemetry data transmission.

In fact, the memory 132 stores the locations (conveniently, in terms of latitude and longitude) of all the ground stations 11 and their characteristics in terms of visibility cones, taking into account features of both ground stations 11 with fixed antennas and those with tracking antennas. In this way, also ground stations 11 with advanced antenna array can be used, which can be conveniently configured to carry out also independent measurements on satellite's position and orbit.

The GNSS receiver 131 provides also the precision on-board timing and store the satellite's positions and velocities with a predefined frequency (e.g., 1 Hz). The CPU 134 takes, as input, the stored positions and velocities, extrapolates satellite's trajectory based on satellite's positions and velocities, and predicts a future orbital path of the satellite 2 for a predefined time period (e.g., for the next 15 minutes). The CPU 134 identifies a possible intersection of the satellite orbit with the visibility cone of one of the ground stations 11. If the satellite orbit intersects a visibility cone, the CPU 134 computes a time of entry (Te) of the satellite 2 into the visibility cone and a time of its outgo (To) therefrom. If the satellite orbit does not intersect any visibility cone, the CPU 134 starts a new orbit propagation.

Conveniently, in order to minimize potential interference among different satellites 2 within one and the same visibility cone, the telemetry packets may be relatively short (e.g., 256 bytes) and sent in about ⅕ of second (like bursts). In addition, the telemetry packet transmission may be conveniently repeated three times to limit the effects of potential interference with other signal, and, therefore, to increase the chance that the ground station 11 correctly receives the telemetry packet. For more demanding satellites in terms of data/telemetry transmission, it is possible to send several different packets in sequence, without modifying the general concept, also because the ground stations 11 are always active in listening mode to receive telemetry data.

Therefore, once the intersection has been detected and the Te and To times have been computed, the CPU 134 determines three transmission times to transmit the telemetry packets. For example, with specific reference to FIG. 4, a first transmission time could be N seconds (e.g., 10 s) after the entry of the satellite 2 into the visibility cone, a second transmission time could correspond to a central point of the satellite orbit inside the visibility cone, and a third transmission could be performed shortly before the satellite 2 exits from the visibility cone.

Figure 5:
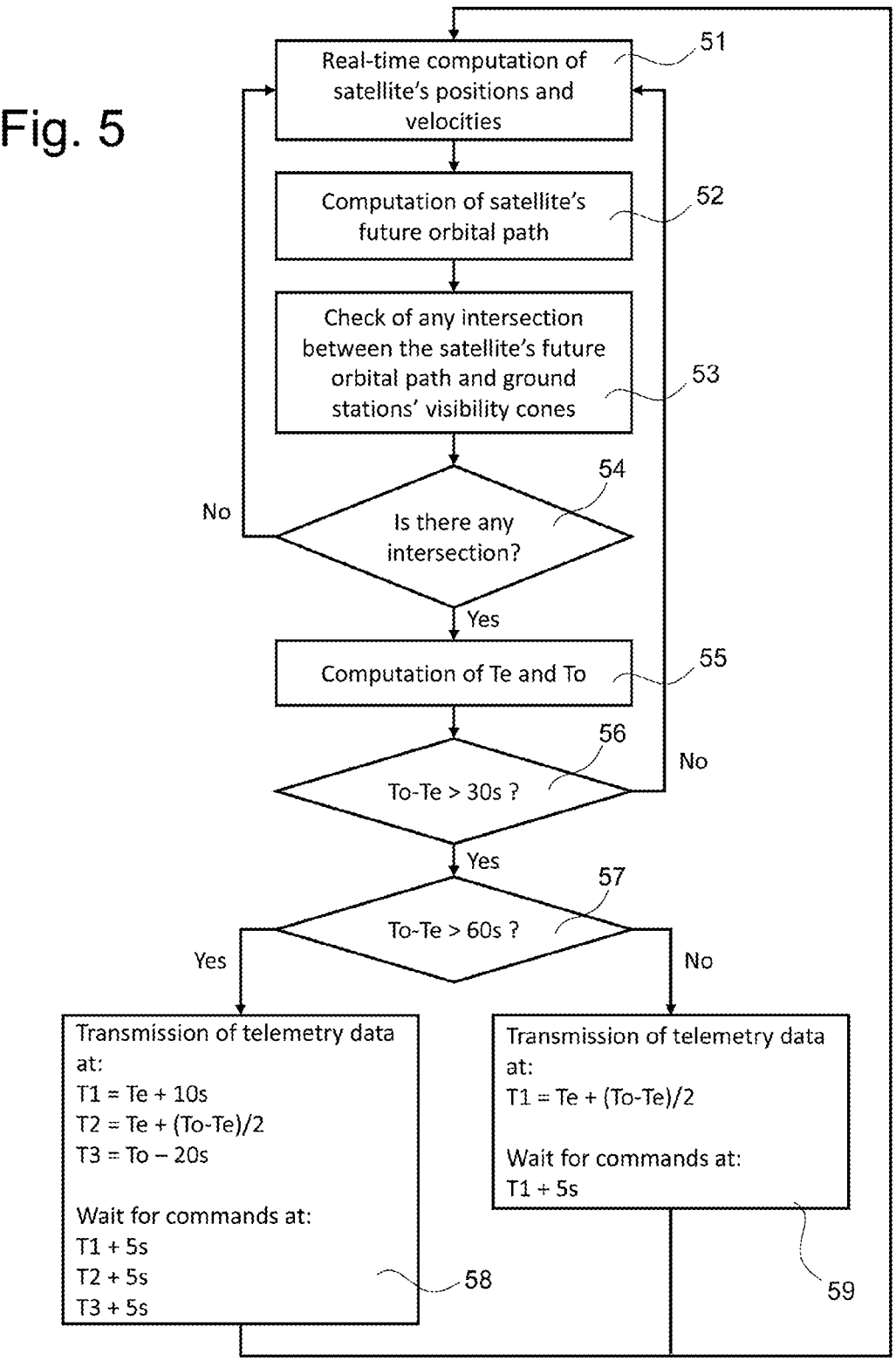
FIG. 5 schematically illustrates an example of operating logic implementable by the on-board TT&C unit of FIG. 2.

In this respect, FIG. 5 schematically illustrates an example of operating logic of the above type implementable by the on-board TT&C unit 13, wherein:
- the GNSS receiver 131 performs real-time computation of satellite's positions and velocities (block 51);
- the CPU 134 computes satellite's trajectory based on satellite's positions and velocities computed by the GNSS receiver 131 and predicts a satellite's future orbital path (block 52) based on satellite's trajectory (e.g., for next 15 minutes);

the CPU 134 checks, on the basis of the coverage data stored on the memory 132, whether satellite's future orbital path intersects the visibility cone of one of the ground stations 11 (blocks 53 and 54);

if an intersection is detected, the CPU 134 computes a time of entry (Te) of the satellite 2 into the intersected visibility cone and a time of its outgo (To) therefrom (block 55); otherwise (namely, if there is no intersection), the operating logic restarts from block 51;

the CPU 134 checks whether To−Te is longer than thirty seconds (block 56); more in general, it checks whether there is enough time for at least one telemetry transmission;

if To−Te>30 s (namely, if there is enough time for at least one telemetry transmission), the CPU 134 further checks whether To−Te is longer than sixty seconds (block 57); more in general, it checks whether there is enough time for multiple telemetry transmissions; otherwise, if To−Te≤30 s (namely, if there isn't enough time for telemetry transmission), the operating logic restarts from block 51;

if To−Te>60 s (namely, if there is enough time for multiple telemetry transmissions), the CPU 134 operates the Rx/Tx unit 133 to transmit a telemetry packet at different times T1, T2 and T3, wherein $T1=Te+10$ s $T2=Te(To-Te)/2$ $T3=To-20$ s, and to wait for commands at $T1+5$ s $T2+5$ s $T3+5$ s (block 58);

otherwise, if To−Te≤60 s (namely, if there isn't enough time for multiple telemetry transmissions), the CPU 134 operates the Rx/Tx unit 133 to transmit a telemetry packet at T1=Te (To−Te)/2 and to wait for commands at T1+5 s (block 59);

then the operating logic restarts from block 51.

Conveniently, after the satellite 2 is passed within the visibility cone of a ground station 11, said ground station may be temporarily excluded from the list of ground stations 11 checked for detecting intersections.

Optionally, the ground stations 11 might be conveniently configured to transmit to the satellites 2 (i.e., to the respective on-board TT&C units 13) acknowledgments of the received telemetry packets.

In case of satellites 2 in the form of small/micro/nano/pico/femto-satellites launched as piggyback payload with multiple satellite release mechanisms, it may happen, at an early stage after the release in orbit, when the "satellite cloud" is still small and the satellites 2 close to each other, that several satellites 2 simultaneously enter the visibility cone of one and the same ground station 11, thereby interfering with each other in telemetry transmission. The same could occur for satellites 2 flying in close formation. To solve this issue, a Time Division Multiple Access (TDMA) approach may be conveniently used. In this case, a respective time slot for telemetry transmission for each period may be conveniently assigned to each satellite 2 (namely, to each on-board TT&C unit 13), wherein synchronization may be conveniently achieved based on GNSS signals. For example, if the period is one minute and each telemetry packet is transmitted, in the form of a burst, in ⅕ of second, it is possible to assign time slots of ⅕ of second, so that in a minute it is possible to manage simultaneously up to sixty satellites 2 (considering three bursts for each window larger than three minutes).

Conveniently, it is possible to activate or not the TDMA on a specific satellite 2, to assign the timeslots and to modify the ground station list stored on the memory 132 by sending specific commands from the ground stations 11 to specific satellites 2.

From the foregoing, the technical advantages of the present invention are immediately clear to those skilled in the art. In particular, it is important to point out that the present invention provides several advantages with respect to traditional solutions based on a ground segment made up of a single ground station specifically dedicated to one mission (i.e., to one satellite).

The advantages may be divided into several domains and do not affect only satellite owners/operators, but also organizations/authorities involved in the monitoring of space access and space safety.

Firstly, the present invention allows enhancing access to satellite telemetry and, more in general, to satellite data.

In fact, as previously explained, according to the traditional solutions, a data link is established only when a satellite passes over the ground station specifically dedicated to said satellite and, depending on satellite's altitude, the duration of the data link is limited to few minutes for each pass. Moreover, LEO satellite coverage of a single ground station is approximately only 3% of satellite's orbital time.

On the contrary, the present invention, which can advantageously employ tens of micro, world-wide distributed ground stations, allows extending the number of downlink transmissions by a factor up to fifty, and receiving a telemetry packet approximately each orbit, independently of satellite's altitude.

Secondly, the present invention provides an easy access to satellite telemetry and, more in general, to satellite data. In fact, thanks to the present invention, a satellite operator shall not procure and manage its own around station by means of its own staff, and shall not certify the staff for radio transmissions, since the present invention provides the satellite operators with telemetry data related to their respective satellite(s) via secure web connection and directly at satellite operators' premises.

Thirdly, the present invention provides a cheap access to satellite telemetry and, more in general, to satellite data. In fact, the cost of TT&C services provided by the present invention is conveniently lower than the cost of making, installing, using (including personnel costs) and maintaining a single ground station.

Additionally, the present invention enables early detection of satellites' malfunctions/failures and quickly tacking countermeasures by providing the satellites with specific commands related to the detected malfunctions/failures. In fact, the present invention allows a satellite operator to receive, with high frequency, telemetry packets containing the most relevant data concerning satellite's integrity state. The early detection of a failure and the possibility of interacting with the satellite affected by the failure by sending specific commands thereto with a short reaction time may help to put the satellite in a safe mode and to try recovering it from the failure. This feature is really useful for LEO satellites, both of the traditional large type and of the small/micro/nano/pico/femto type, and renders the satellite TT&C system according to the invention useful as secondary communication system to be used with traditional large satellites in case of troubles and/or to transmit short telemetry strings continuously at each orbit.

Furthermore, the present invention enables also early identification of the small/micro/nano/pico/femto-satellites and cubesats. In fact, as previously explained in detail, the ever increasing number of small/micro/nano/pico/femto-satellites is posing extraordinary challenges to authorities responsible for satellite identification and tracking. In such a scenario, the present invention allows automatically transmitting identification and telemetry data to visible ground stations without any necessity for satellite orbital data provision from external sources. Moreover, the present invention may conveniently allow also real-time transmission to ground of satellites' positions, velocities and orbital parameters computed on board, thereby providing data very useful to both the satellite operators and to the authorities responsible for satellite identification and tracking.

Additionally, since, according to the present invention, TT&C transmissions are carried out only when a satellite is within the visibility region of a ground station, both interference in the used radiofrequency (RF) band(s) (e.g., UHF and VHF) and on-board power consumption are drastically reduced.

Moreover, the ground stations according to present invention may be conveniently equipped with fixed, zenith-pointed antennas, thereby resulting in said ground stations being much more robust and reliable than those according to traditional solutions employing low-cost pointing antennas installed on COTS-based, computer-controlled rotors.

Furthermore, it is worth noting that, since the present invention conveniently employs a large number of ground stations, the resulting satellite TT&C system is less sensitive to single failure in a ground station and also to weather conditions (in fact, the other ground stations can compensate for a satellite passage over a specific around station, which satellite passage is lost due to local bad weather conditions).

Additionally, it is worth noting also that LEOs are quite crowded orbits and, hence, LEO satellites are often requested to perform manoeuvres to avoid collision with other objects. With a single ground station, due to the limited opportunities of sending commands, a satellite manager is often forced to activate the propulsion system of a satellite to move said satellite from its orbit when the next command window falls after a potential collision event, even though uncertainties about said collision event are large. Instead, the present invention provides a large number of command windows thanks to the world-wide distributed ground stations, thereby allowing delaying the performance of collision avoidance manoeuvres until collision event prediction is more accurate and, hence, avoiding collision avoidance manoeuvres that are not strictly necessary. Less manoeuvres mean less propellant consumption and, hence, an increase in satellites' lifetime.

In conclusion, the satellite TT&C system according to the present invention can be advantageously used as main communication system for LEO small/micro/nano/pico/femto-satellites to send satellite telemetry to around and commands to satellites, without any need for a dedicated ground station. The satellite TT&C system according to the present invention can be also advantageously used as secondary communication system for traditional large satellites to provide early detection of satellites' malfunctions/failures thanks to the large availability of data links provided by the world-wide distributed ground stations. Moreover, by means of the present invention, satellites can automatically send to ground their position and their orbital data, which represent very important information for both the satellite operators and the authorities responsible for satellite identification, monitoring and tracking.

Finally, it is clear that numerous modifications and variants can be made to the present invention, all falling within the scope of the invention, as defined in the appended claims.

The invention claimed is:

1. A satellite telemetry, tracking and command system comprising:
  a plurality of ground stations, each of which is located at a respective position on earth's surface and is configured to, when a satellite is in a respective visibility region of the ground station, receive downlink signals carrying telemetry data from said satellite and transmit thereto uplink signals carrying one or more commands;
  on-board units, each of which is installed on board a respective satellite and is configured to
  receive global navigation satellite system (GNSS) signals from one or more global navigation satellite systems,
  compute, on the basis of the received GNSS signals, positions and velocities of said respective satellite,
  store coverage data indicative of the positions of the ground stations on the earth's surface and of the visibility regions of said ground stations; and
  a network control center, that is connected to the ground stations through one or more Internet Protocol networks and is configured to
  receive commands for satellites through the Internet Protocol network(s) from satellite operators that each own/manage one or more respective satellites,
  provide, through the Internet Protocol network(s), the ground stations with the commands for the satellites,
  receive, through the Internet Protocol network(s), from said ground stations, the telemetry data sent by the satellites, and
  provide, through the Internet Protocol network(s), each satellite operator with the telemetry data sent by the respective satellite(s);
  wherein each of the on-board units is further configured to:
    determine when said respective satellite is within the visibility region of one of the ground stations on the basis of the satellite's computed positions and velocities and of the stored coverage data;
    when said respective satellite is within the visibility region of a ground station, transmit to said ground station the downlink signals and receive therefrom the uplink signals; and
    carry out actions/operations corresponding to the commands received from the ground stations.

2. The satellite telemetry, tracking and command system of claim 1, wherein each on-board unit is further configured to:
  compute a trajectory of the respective satellite based on the satellite's computed positions and velocities;
  determine when said respective satellite is within the visibility region of one of the ground stations also on the basis of the satellite's computed trajectory;
  when said respective satellite is within the visibility region of a ground station, transmit to said ground station downlink signals carrying orbital data indicative of the satellite's computed positions, velocities and trajectory;
  and wherein the network control center is further configured to:

receive, through the Internet Protocol network(s), from the ground stations (11), the orbital data sent by the satellites; and provide, through the Internet Protocol network(s), each satellite operator with the orbital data sent by the respective satellite(s).

3. The satellite telemetry, tracking and command system according to claim 1, wherein each on-board unit is further configured to transmit downlink signals carrying alert data indicative of a malfunction/anomaly/failure on board the respective satellite; and wherein the network control center is further configured to:

receive, through the Internet Protocol network(s), from the ground stations, the alert data sent by the satellites; and provide, through the Internet Protocol network(s), each satellite operator with the alert data sent by the respective satellite(s).

4. The satellite telemetry, tracking and command system according to claim 1, wherein each on-board unit is further configured to:

compute a trajectory of the respective satellite based on the satellite's computed positions and velocities;

compute a future orbital path of said respective satellite based on the satellite's computed trajectory;

check, based on the stored coverage data, whether the satellite's computed future orbital path passes through the visibility region of one of the ground stations; and, if the satellite's future orbital path computed passes through the visibility region of a ground station, compute an entry time at which the respective satellite enters the visibility region of the ground station, compute an outgo time at which said respective satellite goes out of the visibility region of said ground station, if a time difference between the computed outgo and entry times exceeds a first predefined threshold, compute one or more transmission times and one or more reception times depending on whether said time difference is lower than or exceeds a second predefined threshold, and transmit the downlink signals at the computed transmission time(s) and receive the uplink signals at the computed reception time(s).

5. The satellite telemetry, tracking and command system according to claim 1, wherein each of the on-board units is further configured to update the stored coverage data based on one or more received commands.

6. The satellite telemetry, tracking and command system according to claim 1, wherein each of the on-board units comprises:

a GNSS receiver configured to receive GNSS signals from one or more global navigation satellite systems and compute, on the basis of the received GNSS signals, positions and velocities of the respective satellite;

a receiving/transmitting unit configured to transmit the downlink signals and to receive the uplink signals;

a control and processing unit; and a memory for storing the coverage data, the memory also encoded with executable instructions, which, when executed by the control and processing unit cause the satellite telemetry, tracking and command system to determine when the respective satellite is within the visibility region of one of the ground stations on the basis of the satellite's positions and velocities computed by the GNSS receiver and of the coverage data stored on the memory, when said respective satellite is within the visibility region of a ground station, operate the receiving/transmitting unit to transmit the downlink signals carrying the telemetry data to said ground station and to receive therefrom the uplink signals carrying one or more commands, and carry out actions/operations corresponding to the commands received from the ground stations.

7. The satellite telemetry, tracking and command system according to claim 1, wherein the on-board units and the ground stations are respectively configured to:

transmit and receive Ultra High Frequency downlink signals; and receive and transmit Very High Frequency uplink signals.

8. The satellite telemetry, tracking and command system according to claim 1, wherein the on-board units and the ground stations are configured to transmit and receive S-band downlink and uplink signals.

9. An on-board unit of the satellite telemetry, tracking and command system as claimed in claim 1.

10. A satellite comprising one of the on-board units of the satellite telemetry, tracking and command system as claimed in claim 1.

* * * * *